United States Patent
Berinde et al.

(10) Patent No.: US 9,892,004 B2
(45) Date of Patent: Feb. 13, 2018

(54) SPACE EFFICIENT PERSISTENCE OF AN IN-MEMORY TABLE

(71) Applicant: VMWARE, INC., Palo Alto, CA (US)

(72) Inventors: Radu Berinde, Palo Alto, CA (US); Wenguang Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 181 days.

(21) Appl. No.: 14/857,845

(22) Filed: Sep. 18, 2015

(65) Prior Publication Data
US 2017/0083411 A1    Mar. 23, 2017

(51) Int. Cl.
*G06F 11/00* (2006.01)
*G06F 11/14* (2006.01)
*G06F 3/06* (2006.01)

(52) U.S. Cl.
CPC ........ *G06F 11/1469* (2013.01); *G06F 3/0619* (2013.01); *G06F 3/0629* (2013.01); *G06F 3/0673* (2013.01); *G06F 11/1402* (2013.01); *G06F 2201/84* (2013.01)

(58) Field of Classification Search
CPC ............................ G06F 11/1469; G06F 11/1402
See application file for complete search history.

(56) References Cited

U.S. PATENT DOCUMENTS

| 6,185,615 | B1 * | 2/2001 | Labiaga | H04L 29/06 709/224 |
| 7,814,149 | B1 * | 10/2010 | Stringham | G06F 17/30156 707/758 |
| 8,150,810 | B1 * | 4/2012 | Ou | G06F 11/1456 707/649 |
| 2005/0182888 | A1 * | 8/2005 | Murotani | G06F 11/1456 711/1 |
| 2007/0185922 | A1 * | 8/2007 | Kapoor | G06F 11/1469 |
| 2010/0036831 | A1 * | 2/2010 | Vemuri | G06F 17/30516 707/707 |
| 2011/0320403 | A1 * | 12/2011 | O'Krafka | G06F 17/30581 707/620 |
| 2012/0109895 | A1 * | 5/2012 | Zwilling | G06F 11/1471 707/648 |
| 2014/0279900 | A1 * | 9/2014 | Gupta | G06F 17/30309 707/634 |
| 2014/0279930 | A1 * | 9/2014 | Gupta | G06F 11/1464 707/683 |
| 2015/0254240 | A1 * | 9/2015 | Li | G06F 17/30575 707/703 |

(Continued)

*Primary Examiner* — Yolanda L Wilson
(74) *Attorney, Agent, or Firm* — Fish & Richardson P.C.

(57) ABSTRACT

Techniques for efficiently storing the state of an in-memory table to persistent storage are described. In one embodiment, one or more requests to update an entry in an in-memory table with one or more values are received, wherein the in-memory table is stored in non-persistent memory. The one or more entries in the in-memory table are then updated with the one or more values and one or more recent redo log entries that correspond to the one or more entries and one or more values are generated. One or more historical entries in the table are selected and one or more historical redo log entries that correspond to the one or more historical entries are generated. The recent redo log entry and the one or more historical redo log entries are saved to a bounded redo log, wherein the bounded redo log is stored in persistent storage.

18 Claims, 6 Drawing Sheets

(56) References Cited

U.S. PATENT DOCUMENTS

2016/0224434 A1\* 8/2016 Winokur ........... G06F 17/30197
2016/0314161 A1\* 10/2016 Wen .................... G06F 11/1469
2016/0342351 A1\* 11/2016 Li ....................... G06F 11/1471

\* cited by examiner

SPACE EFFICIENT PERSISTENCE OF AN IN-MEMORY TABLE

BACKGROUND

Many computer systems use the concept of an in-memory table structure to store data. In-memory data structures are typically used because they provide faster access to data than similar tables that are stored in persistent forms of storage such as hard drives. When a system that uses an in-memory table crashes and is rebooted, the system may try to restore the state of the in-memory table just before the crash occurred. Many systems implement such a restoration process by using a redo-log that is stored in persistent storage such as a hard drive.

Standard redo logs are implemented such that whenever an entry is updated in the in-memory table, a corresponding redo log entry is created. When the system crashes and is then rebooted, the in-memory table is repopulated to the state just before the crash by replaying the redo log entries.

The size of a standard redo log is unbounded because the number of entries in the redo log grows in direct proportion to the number of changes to the in-memory table (i.e. an entry is made in the redo log for each change made to an entry in the in-memory table). While the number of redo log entries can be reduced using various garbage collection techniques, these techniques are often complex and error prone.

DETAILED DESCRIPTION

In the following description, numerous examples and details are included to provide an understanding of the various embodiments of the invention. However, it will be evident to one skilled in the art that certain embodiments can be practiced without some of these details, or can be practiced with modifications or equivalents of the details.

1. Overview

This document describes techniques that enable space efficient persistence of an in-memory table. In one set of embodiments, the technique is initialized when a module that maintains the state of the in-memory table (the "in-memory table manager") receives a request to update one of the entries in the table. After the in-memory table manager updates the entry in the in-memory table, it then logs the update by creating an entry in a bounded redo log. The redo log is bounded in the sense that it contains a finite number of entries. As such it may be implemented as a circular queue or circular buffer data structure.

In some embodiments, the in-memory table manager coalesces one or more bounded redo log entries by writing them to a cached redo log segment that may be stored in memory. The cached redo log segment contains at least two regions: 1) a "recent region" for storing bounded redo log entries that correspond to recently updated in-memory table entries; and 2) a "historical region" for storing historical redo log entries. Historical entries are bounded redo log entries that correspond to current state of the in-memory table. When an entry in the in-memory table is updated the module create a bounded redo log entry in the region of the cached redo log segment that stores current entries.

After the in-memory table manager creates a bounded redo log entry that logs the update to the in-memory table entry, it then determines one or more historical redo log entries. In some embodiments, the historical redo log entries are determined in sequential order by selecting an in-memory table entry at some arbitrary point in the in-memory table and then selecting additional contiguous in-memory entries. For example, when the in-memory table manager receives the first update to the in-memory table, it may determine that the historical redo log entries will correspond to the first and second entries in the in-memory table and then when the in-memory table manager receives the second update to the in-memory table, it may determine that the historical redo log entries will correspond to the third and fourth entries in the in-memory table and so on. The in-memory table manager then writes these historical redo log entries to the bounded redo log.

In some embodiments, the in-memory table manager writes the historical redo log entries to the historical region of the cached redo log segment. In this embodiment, the in-memory table manager determines if the size of the cached redo log segment is equal to or has exceeded some size threshold. For example, the in-memory table manager may determine that the number of entries in the current region exceeds some threshold. When the size of the log is equal to or exceeds some threshold, then it flushes the cached redo log segment to disk, by writing it to the bounded redo log. In some embodiments, the in-memory table manager determines if the entries in the cached redo log have been cached longer than a time threshold.

The purpose of the redo log is to provide a way to restore the state of the in-memory table if the system shuts down or crashes. In order to restore the in-memory table using the redo log, the in-memory table manager marks all redo log entries (recent or historical) with an ever-increasing sequence number. However, despite the ever-increasing nature of the sequence number there will be a point in the log where a later redo log entry has smaller sequence number value than an earlier redo log entry. This point occurs because the physical locations of the log segments or entries "wrap around" because the bounded log is being used as a circular buffer. This shift from a larger sequence number to a smaller one marks the point on which the redo log starts and the in-memory table manager can replay the log to recreate the state of the in-memory table by replaying entries from the redo log into the in-memory table from this starting point. In other embodiments, the in-memory table manager maintains a separate value that tracks the starting point. In this embodiment, the starting point would also need to be periodically flushed to persistent storage.

With the techniques described in the previous paragraphs, the in-memory table manager can persist the in-memory table entries in a manner that is space efficient because it bounds the size of the redo log. The redo log size is bounded because it need only maintain the number of recently changed entries plus the number of historical entries.

For example, let's say that the size of the in-memory table is 100 entries and that each time a change is made to the in-memory table, the in-memory table manager writes 1 redo log entry for the change and 1 historical redo log entry. After the in-memory table, has been updated 100 times, the in-memory table manager will have created 100 redo log entries and 100 historical redo log entries. The historical entries will represent the state of all in-memory table entries. Therefore, the total number of bounded redo log entries needed to restore the in-memory table will be no more than 200 entries plus the number of entries of one segment. Or, to generalize, for an in-memory table of size N, 2*N+S bounded redo log entries are required to be able to restore the entire in-memory table, if the size of the redo log entry is the same as the size of the historical redo log entry, where S is the number of entries of a segment.

As described in more detail later in this document, the size of the bounded redo log will vary based on how many historical redo log entries the in-memory table writes for each current bounded redo log entry.

These and other aspects of the disclosure are described in further detail in the following sections.

2. General System Environment

Figure 1:
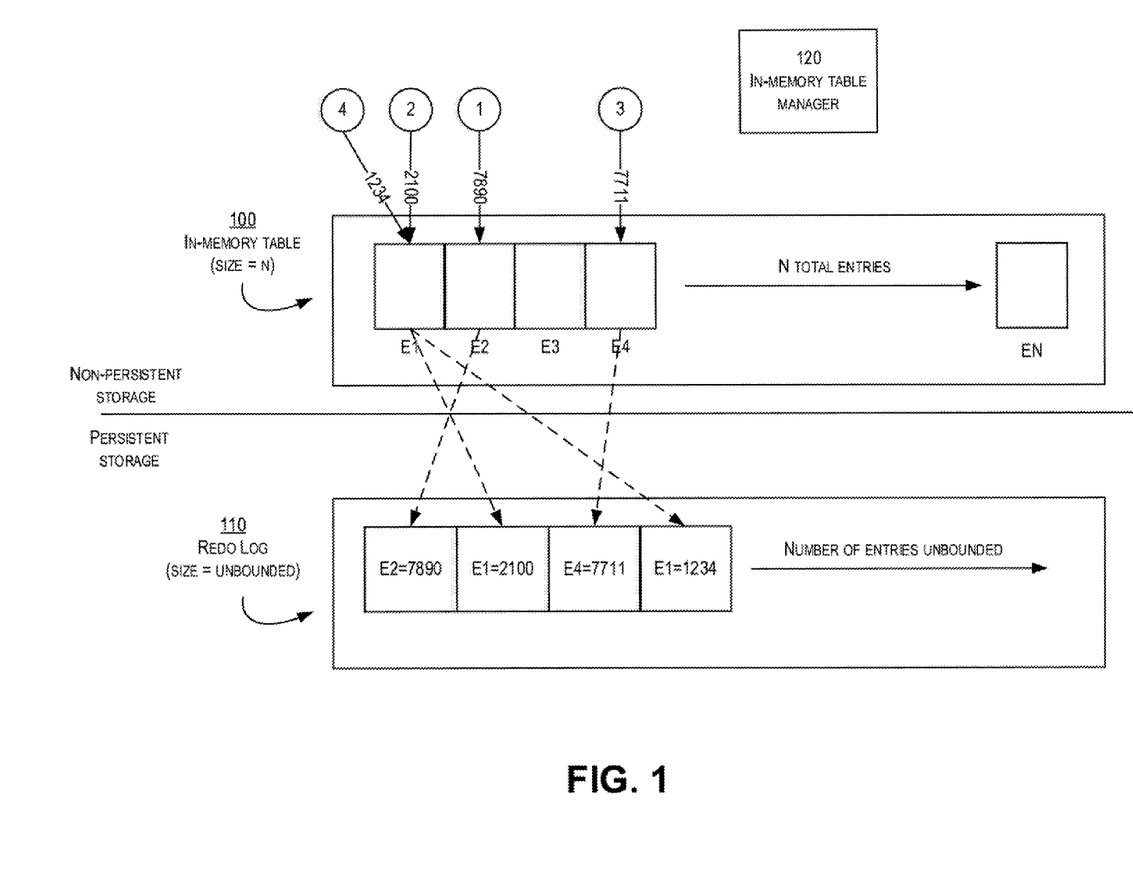
FIG. 1 depicts a general system environment that supports an in-memory table and redo log.

FIG. 1 depicts a general system environment that supports an in-memory table and a corresponding redo log. General system environment may be implemented in the physical hardware of any computer system that includes a physical CPU, non-persistent storage such as random access memory (RAM) and persistent storage such as a storage array network (SAN), locally attached hard drive or solid state disk (SSD).

General system environment includes in-memory table 100. In-memory table 100 is any type of data structure that can be used to track values (e.g. an array or a hash map). In memory-table may reside in some form of physical, non-persistent memory such as RAM. The size of in-memory table 100 is finite and generally calculated as some multiple of the number of entries that the table can hold. For example, if in-memory table 100 can hold 100 1 byte integer values then the size of the table is 100 bytes. Each entry in in-memory table 100 is either set to store some specific value (i.e. entry E1 is set to value 1234) or is null in that it stores no value (e.g. entry E3).

General system environment also includes redo-log 110. Redo log 110 may be stored in persistent memory such as a standard hard drive or any storage media that can persist information. Redo-log 110 is any type of data structure that can be used to store redo log entries that track the changes that have been made to in-memory table 100. For example, redo log may be a doubly-linked list. As entries are updated in in-memory table 100, redo log entries are appended to redo log 110. In theory, various algorithms can be used to remove stale or unneeded entries from redo log 110. For example, if in-memory table 100 entry E1 was updated twice, then redo log 110 would contain two redo log entries: each corresponding to a change to E1. The older of these two redo log entries can be safely removed from redo log 110 by a process called cleaning or garbage collection. In practice, as the number of entries included in redo log 110 grows, the complexity of removing stale entries become expensive and error prone.

General system environment also include in-memory table manager 120 that maintains in-memory table 100 and redo log 110. In-memory table manager 120 is a software module that may be executed by the CPU of a computer. In-memory table manager 120 may be executed by the CPU of the same computer that includes in-memory table 100 or on another computer that is networked to the computer that includes in-memory table 100. In-memory table manager. In memory-table manager may run at any privilege level including user and kernel space.

In-memory table manager 120 uses redo log 110 to persist the state of in-memory table in the following manner. When an entry to in-memory table is updated in-memory table manager 120 creates a corresponding redo log entry. For example, FIG. 1 depicts 4 changes to in-memory table 100 labelled 1-4 respectively. When the first changes is made (i.e. when in-memory table entry E2 is updated to the value 7890), in-memory table manager 120 make a corresponding entry in redo log 110 to indicate that in-memory table entry E2 was updated to the value 7890. As illustrated in FIG. 1, in-memory manager makes similar redo log entries in redo log 110 when in-memory table 100 entries E1, E4 and EN. The redo log 110 grows as more in-memory table 100 entries are updated.

In some cases, the same in-memory table 100 entry is updated more than once. For example, in-memory table 100 entry E1 is first updated to the value 2100 and then subsequently to value 1234. In this case, the first redo log entry for E1=2100 is no longer needed. However, as mentioned previously, pruning these type of stale entries from the redo log can be time consuming and error prone.

3. Space-Efficient System Environment

Figure 2:
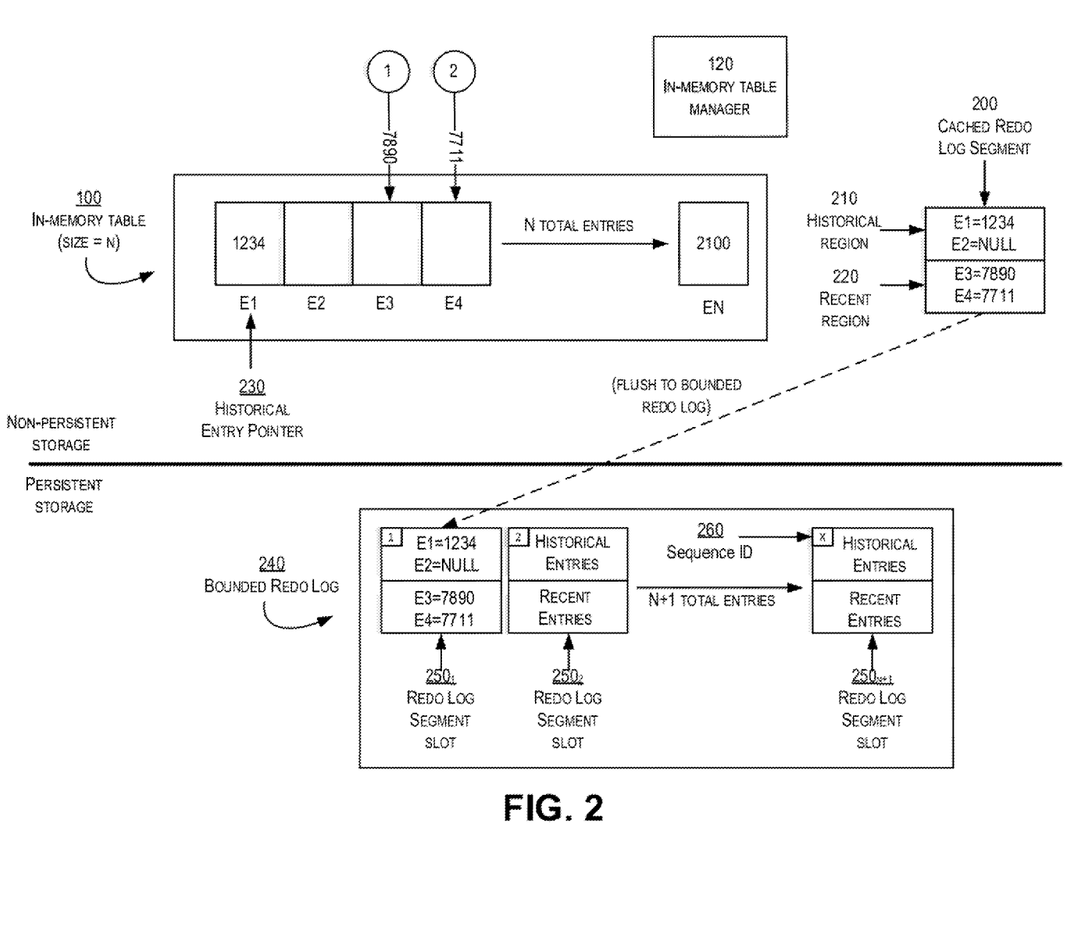
FIG. 2 depicts a system environment that supports space efficient persistence of an in-memory table.

FIG. 2 depicts a system environment that supports space efficient persistence of an in-memory table. For the sake of brevity, in-memory table 100 and in-memory table manager 120 will not be described as they are the same elements as the ones included in FIG. 1.

Space-efficient system environment may include cached redo log segment 200. Cached redo log segment 200 may reside in non-persistent storage such as RAM and is subdivided into at least two regions: 1) historical region 210 and 2) recent region 220. Recent region 220 will include redo log entries that correspond to in-memory table entries that have been recently modified. Historical region 210 will include redo log entries that correspond to some arbitrary in-memory table 100 entries.

When an in-memory table 100 entry is modified, in-memory table manager 120 classifies the change as "recent" and generates a corresponding redo log entry in recent region 220. For example, at step 1 when in-memory table manager 120 updates E3 with the value of 7890, in-memory table manager 120 also generates the redo log entry E3=7890 in recent region 220.

For each entry in recent region 220, in-memory table manager 120 will generate at least one redo log entry in historical region 210. In-memory table manager 120 may select which entry to write to historical region 210 by consulting the value of historical entry pointer 230. For example, in FIG. 2 historical pointer 230 points to entry E1 although it could also be initialized to point to any other arbitrary entry. Because E1 has the value of 1234, in-memory table manger 120 will generate a redo log entry in historical region 210 of E1=1234. In-memory table manager will then increment the value of historical pointer 230 to point to E2. Next, when entry E4 is updated to the value 7711, in-memory table manager will update recent region 220 with redo log entry E4=7711 and historical region 210 with redo log entry E2=NULL.

In some embodiments, more than one historical entry may be recorded per in-memory table update. In these embodiments, subsequent values of historical pointer may be determined by incrementing by a value greater than 1. For example, when E3 is updated to 7890, in-memory table manager 120 may generate two redo entries to be included in historical region 210, one for entry E1 and one for E2. In that embodiment, historical entry pointer 230 would be incremented by 2 and point to E3. By writing more historical entries per recent entry, in-memory table manager 120 can persist in-memory table 100 in less physical space at the cost of increasing the write amplification each time an entry is updated in in-memory table 100. In yet another embodiment, historical entry pointer 230 can be a number that corresponds to the next historical entry.

In other embodiments, a historical entry may be recorded only after multiple entries are updated in in-memory table 100. For example, in-memory table manager may wait until E3 is updated to 7890 and E4 is updated to 7711 before generating historical entry E1=1234. By writing fewer historical entries per recent entry, in-memory table manager 120 can persist in-memory table 100 using more physical space but minimizes the write amplification each time an entry is updated in in-memory table 100.

When historical pointer 230 reaches the last entry of in-memory table 100, in-memory table manager 120 can reset historical pointer 230 to its initial value. Any scheme for selecting historical entries may be utilized provided the scheme ultimately selects all in-memory table 100 entries within a finite set of updates to in-memory table 100.

After in-memory table updates cached redo log segment 200 with recent and historical entries, it evaluates whether the number of entries has reached some threshold. When the threshold has been reached, in-memory table manager may then flush the cached redo log segment 200 to a first redo log segment slot within bounded redo log 240.

Bounded redo log 240 is bounded in the sense that it includes a finite number of entries. In one embodiment (depicted in FIG. 2) bounded redo log includes a finite number of redo log segment slots $250_1$ to $250_N$. After all redo log segment slots are filled, in-memory table manager 120 flushes subsequent cached redo log segments to bounded redo log 240 starting at an initial slot. In-memory table manager 120 can select any arbitrary slot $250_1$ to $250_N$ as the initial slot. Each redo log segment slot includes redo log segment information similar to cached redo log segment 200 in that it includes both recent and historical redo log entries. However, it also contains sequence ID 260.

In-memory table manager 120 flushes cached redo log segment 200 by choosing an initial slot among redo log segment slots $250_1$ to $250_N$ and writing the recent and historical redo log entries from historical region 210 and recent region 220 to the corresponding regions of the chosen slot. For example, in FIG. 2, in-memory manager has chosen redo log segment slot $250_1$ and written the values from cached redo log segment 200 to that slot. In-memory table manager 120 then writes a value to sequence ID 260. This ID is an ever increasing value. For example, in FIG. 2, in-memory table manager 120 writes 1 to the sequence ID of redo log segment slot $250_1$, 2 to the sequence ID of redo log segment slot $250_2$ and so on. In-memory table manager may use any algorithm for determining the next sequence ID as long as that algorithm chooses an ever increasing value. For example, rather than calculating the sequence ID by adding 1 to the previous sequence ID, in-memory table manager 200 could add 2 to the previous sequence ID. As will be described in subsequent paragraphs, in-memory table manager 120 may use the sequence ID to restore the values of in-memory table 100 when it replays bounded redo log 240.

Figure 2A:
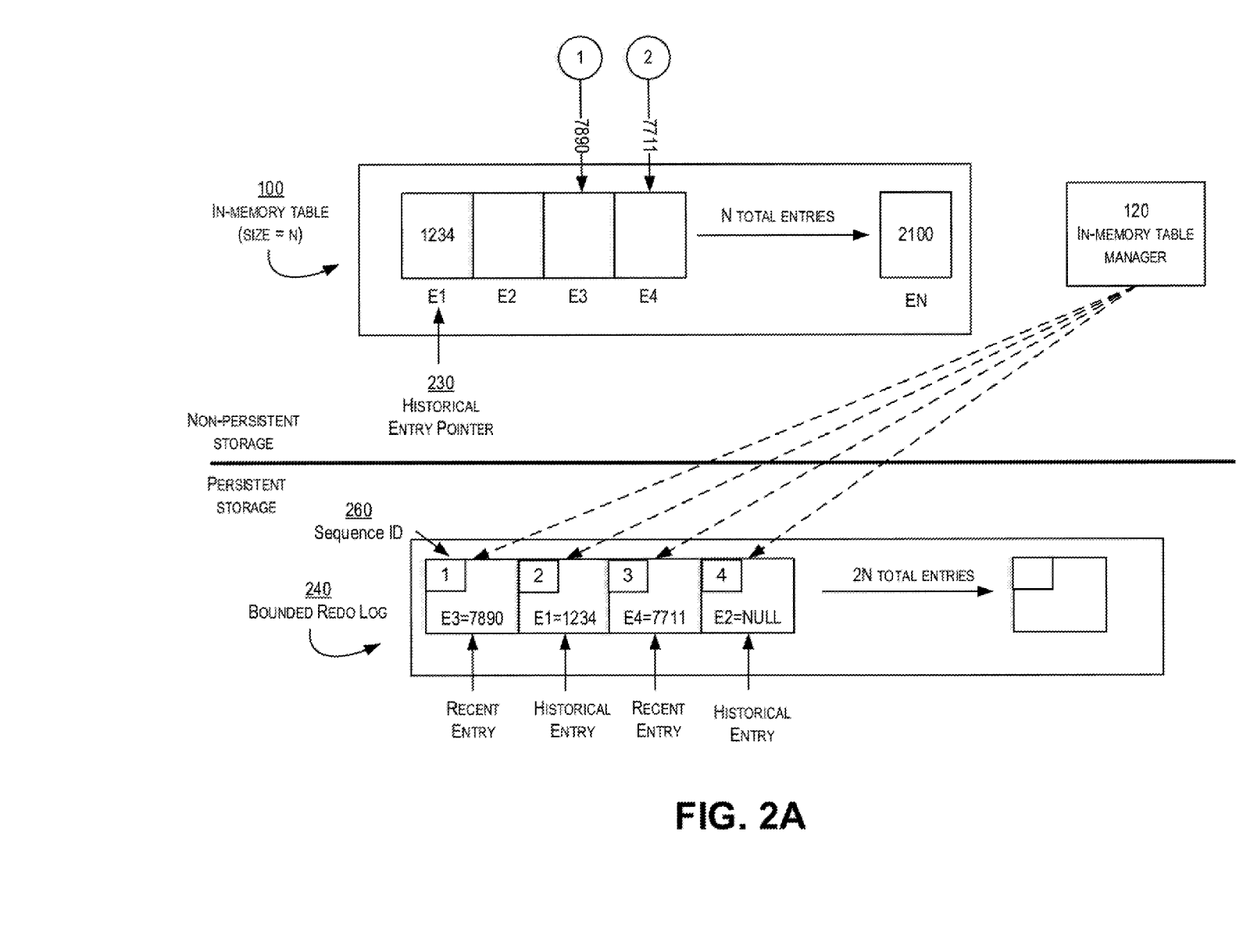
FIG. 2A depicts an alternate system environment that supports space efficient persistence of an in-memory table.

FIG. 2A depicts an alternate embodiments where in-memory table manager 200 chooses to bypass caching recent and historical entries in redo log segments and instead writes them directly to bounded redo log 240. In this embodiment, bounded redo log does not include redo log segment slots. When an in-memory table 100 entry is updated, in-memory table manager 200 will write a recent redo log entry that corresponds to the update directly to bounded redo log 240 along with an ever increasing sequence ID. It will then write one or more historical redo log entries to the bounded redo log 240 along with their sequence IDs.

For example, at step 1 when E3 is updated with the value 7890, in-memory table manager 120 makes corresponding recent redo log entry of E3=7890 and sequence ID 1 in bounded redo log 240. In-memory table manager then consults historical entry pointer 230 to determine that it should also make a corresponding historical redo log entry of E1=1234 and a sequence ID of 2 in bounded redo log 240. In-memory table manager 120 makes similar recent and historical redo log entries in bounded redo log 240 when E4 is updated to 7711 at step 2.

4. Persistence Workflow

Figure 3:
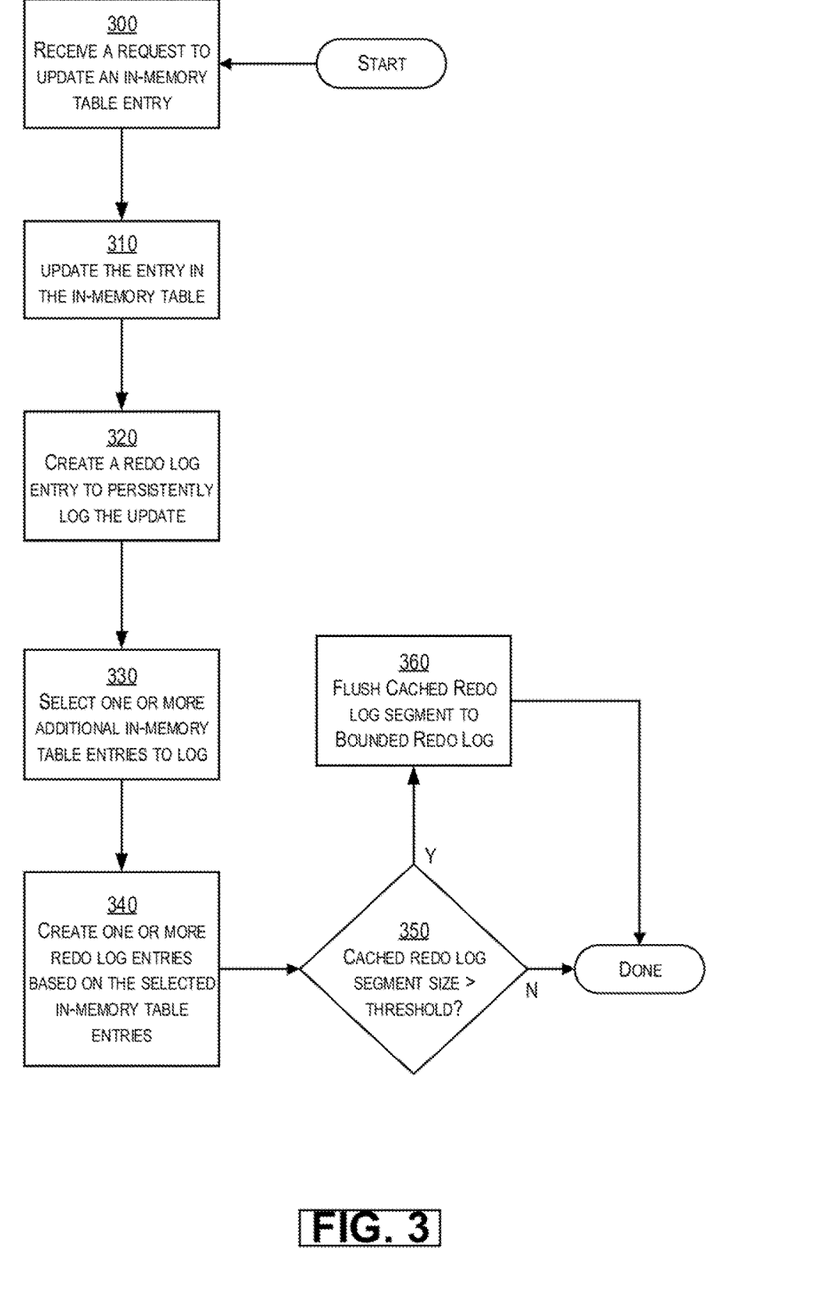
FIG. 3 is a flowchart depicting a workflow for space efficient persistence of an in-memory table.

FIG. 3 is a flowchart depicting a workflow for space efficient persistence of an in-memory table according to some embodiments. Note, even though this workflow is described as being performed by in-memory table manager 120, one of ordinary skill in the art would recognize that the steps could be performed by other modules or spread among multiple modules.

The workflow begins at step 300 when in-memory table manager 120 receives a request to update an entry in in-memory table 100, For example, the request may be to update entry E1 with the value 1234. At step 310, in-memory table manager 120 updates the entry in in-memory table 100 with the value contained in the request. For example, in-memory table manager 120 may set the E1 in-memory table entry to the value 1234.

At step 320, in-memory table manager 120 will create a redo log entry to persistently log the update. In one embodiment, in-memory table manager will create this redo log entry in recent region 220 of cached redo log segment 200. For example, in-memory table manager 120 will create the redo log entry E1=1234. In another embodiment, in-memory table manager 120 will write the redo log entry directly to bounded redo log 240 rather than cached redo segment 200. In this embodiment, in-memory table manager 120 calculates the next sequence ID 260 and writes the next sequence ID 260 to bounded redo log 240. In-memory table manager 120 may determine the sequence ID 260 by using any suitable algorithm that chooses a number that is greater than the previous sequence ID 260.

At step 330, in-memory table manager 120 will select one or more additional in-memory table 100 entries to log. In particular, in-memory table manager 120 will select one or more entries from in-memory table 100 and create corresponding historical redo log entries. In-memory table manager 120 may select these entries by consulting historical entry pointer 230 that points to the next in-memory table 100 entry to process. For example, if historical entry pointer points to entry E2, in-memory table manager 120 will create a redo log entry for E2. In some embodiments, multiple in-memory table 100 entries may be determined. For example, if historical entry pointer points to entry E2, in-memory table manager 120 will create a redo log entries for E2 and E3.

At step 340, in-memory table manager 120 will create one or more redo log entries that correspond to the in-memory table 100 entries that were selected in step 330. In one embodiment, in-memory table manager 120 writes these selected entries to historical region 210 of cached redo log segment 200. For example, if in-memory table 100 entries E2 and E3 were selected in step 330 an the values of these entries were, respectively 4567 and 8901, then in-memory table manager 120 will create redo log entries in historical region 210 of cached redo log segment 200 of E2=4567 and E3=8901. In another embodiment, in-memory table manager 120 will write any historical redo log entries directly to bounded redo log 240 rather than cached redo segment 200. In this embodiment, in-memory table manager 120 calculates the next sequence ID 260 and writes the next sequence ID 260 along with the historical redo log entries. In-memory table manager 120 may determine the sequence ID 260 by using any suitable algorithm that chooses a number that is greater than the previous sequence ID 260. In this embodiment, the process is done.

At decision 350, in-memory table manager 120 determines whether the size of cached redo log segment 200 is greater than some threshold. In some embodiments, in-memory table manager 120 may base the decision on the number of redo log entries contained in cached redo log segment 200. For example, if the threshold may limit the size of the cached redo log segment 200 to 2 historical entries. If in-memory table manager 120 determines that the threshold has not been reached, the process is done.

If in-memory table manager 120 determines that the threshold has been reached then at step 360, in-memory table manager 120 flushes cached redo log segment 200 to bounded redo log 240. In some embodiments, in-memory table manager 120 flushes cached redo log segment 200 by selecting a bounded redo log segment slot in bounded redo log 240 and writing cached redo log segment 200 to the selected slot. For example, in-memory table manager 120 may write cached redo log segment 200 to redo log segment slot $250_1$. In this embodiment, in-memory table manager 120 will determine a next sequence ID 260 and write the determined sequence ID to the same redo log segment slot. In-memory table manager 120 may determine the sequence ID 260 by using any suitable algorithm that chooses a number that is greater than the previous sequence ID 260.

5. Recovery Workflow

Figure 4:
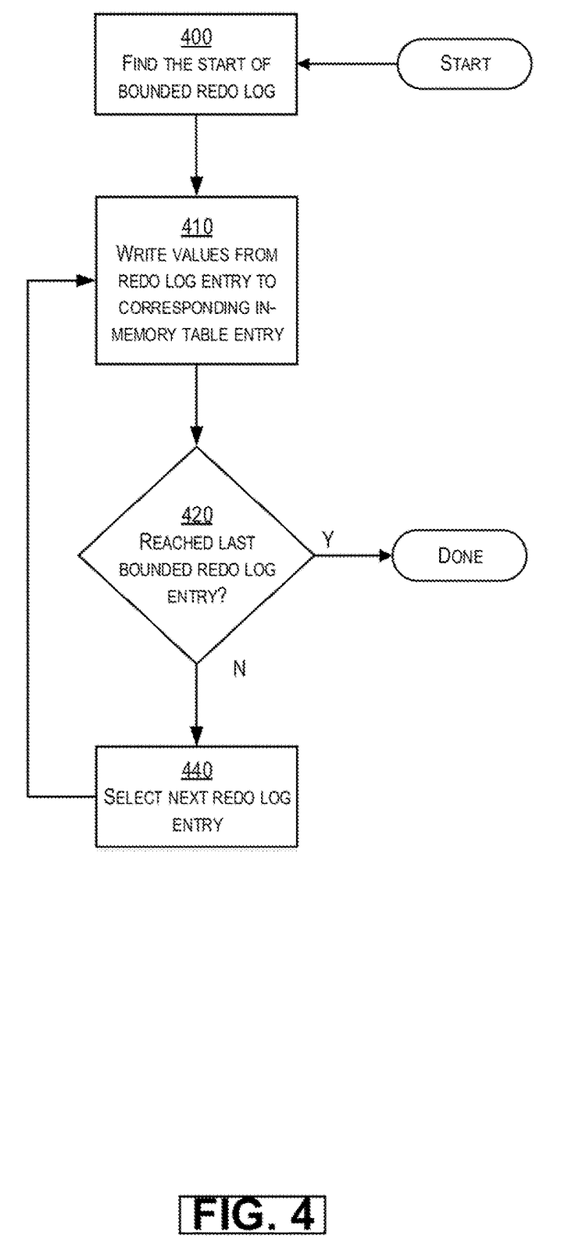
FIG. 4 is a flowchart depicting a workflow for recovering an in-memory table using a space efficient persistence of an in-memory table.
Figure 5:
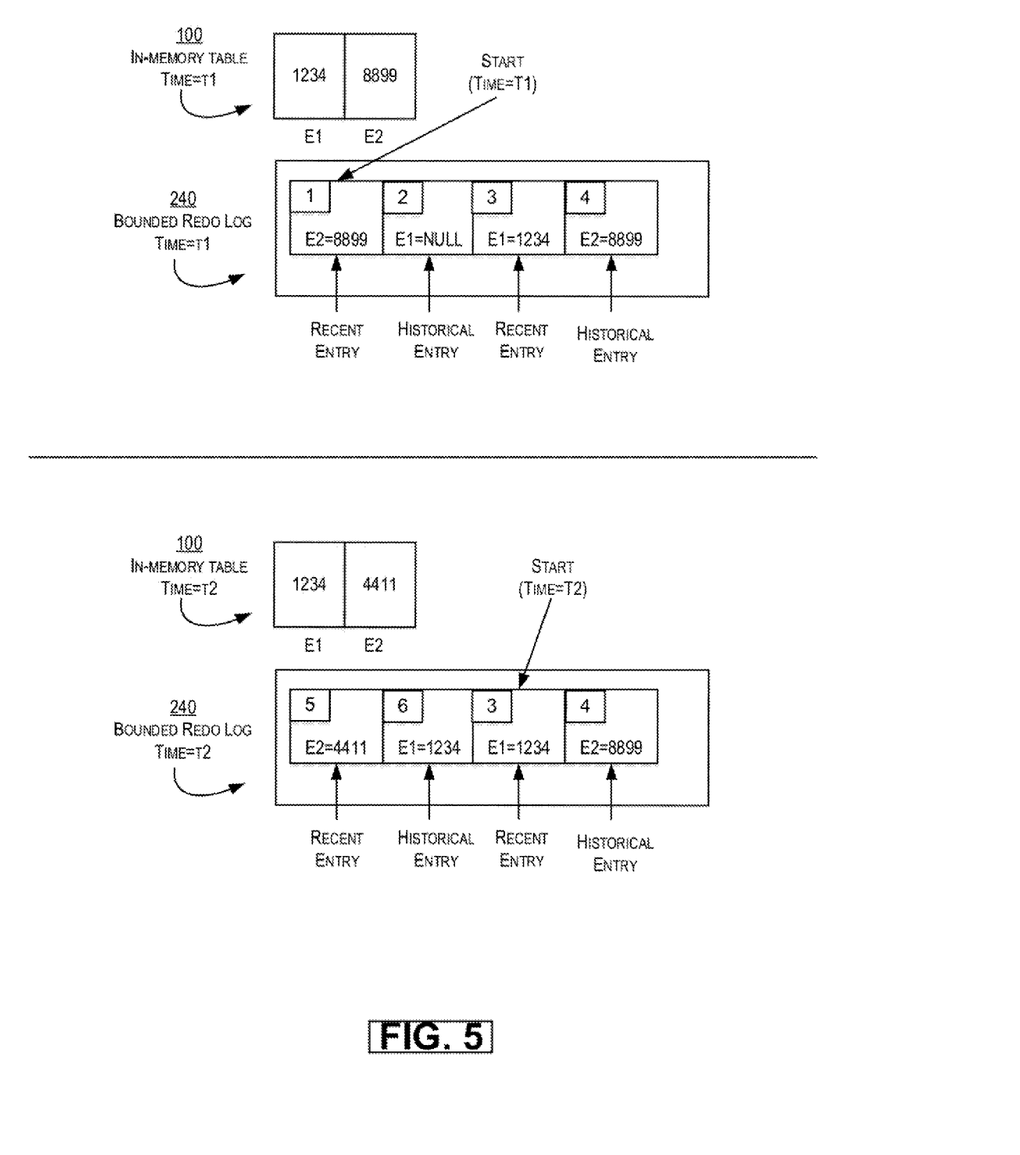
FIG. 5 depicts an in-memory table and corresponding bounded redo log at two different points in time.

FIG. 4 depicts a workflow for recovering an in-memory table using the results of a space efficient persistence of an in-memory table. Because the size of the bounded redo log is fixed, the start of the redo log can vary as in-memory table entries are updated. Therefore, the workflow begins as step 400 where in-memory table manager 120 finds the start of the bounded redo log 240. FIG. 5. More clearly illustrates how the start of the bounded redo log can shift.

The top half of FIG. 5 depicts the state of the in-memory table 100 and the corresponding bounded redo log 240 at time T1 according to some embodiments. To get both tables to this state, assume the following entries were made in the following order: 1) E2 was updated to 8899 resulting in bounded redo log recent entry E2=8899 and historical entry E1=NULL and 2) E1 was updated to 1234 resulting in bounded redo log recent entry E1=1234 and historical entry E2=8899. Subsequently, at time T1, the start of the bounded redo log is identified by the entry containing sequence ID 1.

At time T2, a time subsequent to T1, assume that E2 is updated to 4411 resulting in bounded redo log recent entry E2=4411 and historical entry E1=1234. Because the entries with sequence IDs 1 and 2 have been overwritten, at time T2, the start of the bounded redo log is now identified by the entry containing sequence ID 3.

In-memory table manager 120 can find the start of bounded redo log 240 by identifying the point where the sequence ID decreases in value. In some embodiments, in-memory table manager 120 can start examining the sequence IDs starting at the first entry in bounded redo log 240 and stopping once it finds a sequence number that is smaller than the previous sequence number. In other embodiments, in-memory table manager 120 can perform a binary search of bounded redo log.

At step 410, in-memory table manager 120 writes the values from the redo log entry to the in-memory table 100. In one embodiment, in-memory table manager 120 writes the values from a redo log segment to in-memory table 100. For example, in the environment described in FIG. 2, in-memory table manager 120 would write the values from the historic and recent regions of redo log segment $250_1$ (which includes the smallest sequence ID) to in-memory table by setting E1 to 1230, E2 to NULL, E3 to 7890 and E4 to 7711. In other embodiments, in-memory table manager 120 will write the value directly from the redo log entries stored in bounded redo log 240. For example, in the environment described in FIG. 2A, in-memory table manager 120 would set E3 to 7890 because that redo log entry includes the smallest sequence ID.

At step 420, in-memory table manager 120 determines if it has reached the last bounded redo log 240 entry. In one embodiment, in-memory table manager determines the last entry by calculating the total number of entries in bounded redo log 240. In general, the size of the bounded redo log is calculated in terms of the recent redo log entries (RE) and the historical redo log entries (HE) per in-memory table 100 update and the number of entries in the in-memory table 100 (NE). The general formula is (HE+RE)*(NE)/(HE)+(HE+RE). The extra (HE+RE) is the size of a segment in the redo log. For example, if the size of in-memory table 100 is (NE=4) entries and each time an entry in in-memory table 100 is updated RE=1 recent redo log entry and HE=1 historical entry is generated, then the size of bounded redo log will be (1+1)*(10,000)/1+(1+1)=20,002 entries. Alternatively, if the size of in-memory table 100 is NE=1,000 entries and each time an entry in in-memory table 100 is updated RE=1 recent redo log entry and HE=2 historical entries are generated, then the size of bounded redo log will be (1+2)*(1,000)/2+(1+2)=1,503 entries.

If in-memory table manager 120 has reached the last bounded redo log 240 entry, then the workflow is done. If in-memory table manager 120 has not reached the last bounded redo log 240 entry, then in-memory table manager 120 proceeds to step 440 where it selects the next redo log entry and proceeds back to step 410.

The diagrams of FIGS. 1-3 are illustrative and various modifications are possible. For example, although specific sequences of steps are shown, other sequences of steps may be performed in other embodiments. Further, steps described as sequential can be executed in parallel, order of steps can be varied, and steps may be modified, combined, added, or omitted. One of ordinary skill in the art will recognize many variations, modifications, and alternatives.

Certain embodiments described in this document can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the detailed description and throughout the claims that follow, "a," "an," and "the" includes plural references unless the context clearly dictates otherwise. Also, as used in the detailed description and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for efficiently storing the state of an in-memory table to persistent storage comprising:
    receiving a request to update a first entry in an in-memory table with a value, wherein the in-memory table is stored in non-persistent memory;
    updating the first entry in the in-memory table with the value;
    generating one or more recent redo log entries that correspond to the value;
    selecting one or more historical entries from the in-memory table wherein the historical entries correspond to one or more in-memory table entries in addition to the first entry;
    generating one or more historical redo log entries that correspond to the one or more historical entries; and
    saving the recent redo log entry and the one or more historical redo log entries to a bounded redo log, wherein the bounded redo log is stored in persistent storage and can be used to restore the state of the in-memory table.

2. The method of claim 1 wherein saving the recent redo log entry and the one or more historical redo log entries to the bounded redo log table comprises:
    in response to updating the entry in the in-memory table:
        generating a recent redo log entry sequence identifier (ID);
        generating one or more historical redo log sequence IDs, wherein one or more historical redo log sequence IDs will be included with the one or more historical redo log entries;
        writing the recent redo log entry to the bounded redo log wherein the recent redo log entry includes the recent redo log entry sequence ID; and
        writing the one or more historical redo log entries to the bounded redo log wherein the one or more historical redo log entries include one or more historical redo log sequence IDs.

3. The method of claim 1 wherein saving the recent redo log entry and the one or more historical redo log entries to the bounded redo log table comprises:
    writing the recent redo log entry to a cached redo log segment, wherein the cached redo log segment is stored in non-persistent memory;
    writing the one or more historical redo log entries to the cached redo log segment;
    determining if the size of the cached redo log segment has exceeded a threshold; and
    in response to determining that the size of the cached redo log segment has exceeded the threshold:
        generating a redo log segment sequence ID;
        writing the cached redo log segment to a bounded redo log entry wherein the redo log segment includes the redo log segment sequence ID.

4. The method of claim 3 wherein determining if the size of the cached redo log segment has exceeded the threshold comprises:

determining that the number of recent redo log entries included in the cached redo log segment plus the number of historical redo log segment entries included in the cached redo log segment exceeds the threshold.

5. The method of claim 3 wherein determining if the size of the cached redo log segment has exceeded the threshold comprises:
determining that the recent redo log entries included in the cached redo log segment plus the historical redo log segment entries included in the cached redo log have stayed in the cache longer than a time threshold.

6. The method of claim 1 further comprising:
finding two consecutive redo log entries in the bounded redo log wherein the value of the sequence ID included in a first consecutive redo log entry is greater than the value of the sequence ID included in a second consecutive redo log entry;
setting a selected redo log entry to the second consecutive redo log entry; and
repeating the following steps until the value of the sequence ID included in the selected redo log entry is equal to the value of the sequence ID included in the first consecutive redo log entry:
updating an entry in the in-memory table with a value included in the selected redo log entry;
setting the selected redo log entry to the next redo log entry.

7. A computer system for efficiently storing the state of an in-memory table to persistent storage comprising:
a processor; and
receive a request to update a first entry in an in-memory table with a value, wherein the in-memory table is stored in non-persistent memory;
update the first entry in the in-memory table with the value;
generate one or more recent redo log entries that correspond to the value;
select one or more historical entries from the in-memory table wherein the historical entries correspond to one or more in-memory table entries in addition to the first entry;
generate one or more historical redo log entries that correspond to the one or more historical entries; and
save the recent redo log entry and the one or more historical redo log entries to a bounded redo log, wherein the bounded redo log is stored in persistent storage and can be used to restore the state of the in-memory table.

8. The computer system of claim 7 wherein saving the recent redo log entry and the one or more historical redo log entries to the bounded redo log table comprises:
in response to updating the entry in the in-memory table:
generating a recent redo log entry sequence identifier (ID);
generating one or more historical redo log sequence IDs, wherein one or more historical redo log sequence IDs will be included with the one or more historical redo log entries;
writing the recent redo log entry to the bounded redo log wherein the recent redo log entry includes the recent redo log entry sequence ID; and
writing the one or more historical redo log entries to the bounded redo log wherein the one or more historical redo log entries include one or more historical redo log sequence IDs.

9. The computer system of claim 7 wherein saving the recent redo log entry and the one or more historical redo log entries to the bounded redo log table comprises:
writing the recent redo log entry to a cached redo log segment, wherein the cached redo log segment is stored in non-persistent memory;
writing the one or more historical redo log entries to the cached redo log segment;
determining if the size of the cached redo log segment has exceeded a threshold; and
in response to determining that the size of the cached redo log segment has exceeded the threshold:
generating a redo log segment sequence ID;
writing the cached redo log segment to a bounded redo log entry wherein the redo log segment includes the redo log segment sequence ID.

10. The computer system of claim 9 wherein determining if the size of the cached redo log segment has exceeded the threshold comprises:
determining that the number of recent redo log entries included in the cached redo log segment plus the number of historical redo log segment entries included in the cached redo log segment exceeds the threshold.

11. The computer system of claim 9 wherein determining if the size of the cached redo log segment has exceeded the threshold comprises:
determining that the recent redo log entries included in the cached redo log segment plus the historical redo log segment entries included in the cached redo log have stayed in the cache longer than a time threshold.

12. The computer system of claim 7 whereon the processor is further configured to:
find two consecutive redo log entries in the bounded redo log wherein the value of the sequence ID included in a first consecutive redo log entry is greater than the value of the sequence ID included in a second consecutive redo log entry;
set a selected redo log entry to the second consecutive redo log entry; and
repeat the following steps until the value of the sequence ID included in the selected redo log entry is equal to the value of the sequence ID included in the first consecutive redo log entry:
update an entry in the in-memory table with a value included in the selected redo log entry;
set the selected redo log entry to the next redo log entry.

13. A non-transitory computer readable storage medium having stored thereon software executable by a host system, the software embodying a method that comprises:
receiving a request to update a first entry in an in-memory table with a value, wherein the in-memory table is stored in non-persistent memory;
updating the first entry in the in-memory table with the value;
generating one or more recent redo log entries that correspond to the value;
selecting one or more historical entries from the in-memory table wherein the historical entries correspond to one or more in-memory table entries in addition to the first entry;
generating one or more historical redo log entries that correspond to the one or more historical entries; and
saving the recent redo log entry and the one or more historical redo log entries to a bounded redo log, wherein the bounded redo log is stored in persistent storage and can be used to restore the state of the in-memory table.

14. The non-transitory computer readable storage medium of claim 13 wherein saving the recent redo log entry and the one or more historical redo log entries to the bounded redo log table comprises:
in response to updating the entry in the in-memory table:
generating a recent redo log entry sequence identifier (ID);
generating one or more historical redo log sequence IDs, wherein one or more historical redo log sequence IDs will be included with the one or more historical redo log entries;
writing the recent redo log entry to the bounded redo log wherein the recent redo log entry includes the recent redo log entry sequence ID; and
writing the one or more historical redo log entries to the bounded redo log wherein the one or more historical redo log entries include one or more historical redo log sequence IDs.

15. The non-transitory computer readable storage medium of claim 13 wherein saving the recent redo log entry and the one or more historical redo log entries to the bounded redo log table comprises:
writing the recent redo log entry to a cached redo log segment, wherein the cached redo log segment is stored in non-persistent memory;
writing the one or more historical redo log entries to the cached redo log segment;
determining if the size of the cached redo log segment has exceeded a threshold; and
in response to determining that the size of the cached redo log segment has exceeded the threshold:
generating a redo log segment sequence ID;
writing the cached redo log segment to a bounded redo log entry wherein the redo log segment includes the redo log segment sequence ID.

16. The non-transitory computer readable storage medium of claim 15 wherein determining if the size of the cached redo log segment has exceeded the threshold comprises:
determining that the number of recent redo log entries included in the cached redo log segment plus the number of historical redo log segment entries included in the cached redo log segment exceeds some threshold.

17. The non-transitory computer readable storage medium of claim 15 wherein determining if the size of the cached redo log segment has exceeded the threshold comprises:
determining that the recent redo log entries included in the cached redo log segment plus the historical redo log segment entries included in the cached redo log have stayed in the cache longer than a time threshold.

18. The non-transitory computer readable storage medium of claim 13 further comprising:
finding two consecutive redo log entries in the bounded redo log wherein the value of the sequence ID included in a first consecutive redo log entry is greater than the value of the sequence ID included in a second consecutive redo log entry;
setting a selected redo log entry to the second consecutive redo log entry; and
repeating the following steps until the value of the sequence ID included in the selected redo log entry is equal to the value of the sequence ID included in the first consecutive redo log entry:
updating an entry in the in-memory table with a value included in the selected redo log entry;
setting the selected redo log entry to the next redo log entry.

* * * * *